United States Patent [19]

Ancheta et al.

[11] Patent Number: 4,974,223
[45] Date of Patent: Nov. 27, 1990

[54] PARALLEL ARCHITECTURE FOR HIGH SPEED FLAG DETECTION AND PACKET IDENTIFICATION

[75] Inventors: Teofilo C. Ancheta, Ossining; Alexander Birman, Chappaqua; Pao-Chi Chang; Roch Guerin, both of Yorktown Heights, all of N.Y.

[73] Assignee: International Business Machines Corporation, Armonk, N.Y.

[21] Appl. No.: 408,984

[22] Filed: Sep. 18, 1989

[51] Int. Cl.⁵ .......................... H04J 3/24; H04L 7/02
[52] U.S. Cl. .................... 370/94.1; 370/105; 375/116
[58] Field of Search ............ 370/94.1, 48, 58.1, 370/60, 60.1, 68, 110.1, 105, 105.4, 112; 375/95, 117, 116

[56] References Cited

U.S. PATENT DOCUMENTS

| | | | |
|---|---|---|---|
| 4,413,337 | 11/1983 | Dauphin et al. | 370/58.1 |
| 4,494,231 | 1/1985 | Slawy et al. | 370/60 |
| 4,577,314 | 3/1986 | Chu et al. | 370/94.1 |
| 4,594,708 | 10/1986 | Servel et al. | 370/94.1 |
| 4,631,718 | 12/1986 | Miyao | 370/94.1 |
| 4,727,558 | 2/1988 | Hall | 370/105 |
| 4,748,623 | 5/1988 | Fujimoto | 370/105 |
| 4,764,919 | 8/1988 | Hunter et al. | 370/60 |
| 4,768,192 | 8/1988 | Pattavina et al. | 370/105.4 |
| 4,779,269 | 10/1988 | Bouillot et al. | 370/110.1 |
| 4,780,870 | 10/1988 | McHarg et al. | 370/60 |
| 4,791,639 | 12/1988 | Afheldt et al. | 370/58.1 |
| 4,797,678 | 1/1989 | Tsuji et al. | 375/95 |
| 4,811,339 | 3/1989 | Bouillot et al. | 370/94.1 |
| 4,811,367 | 3/1989 | Tajika | 370/105 |

OTHER PUBLICATIONS

William I. Fletcher, "An Engineering Approach to Digital Design", Prentice-Hall, Inc., Englewood Cliffs, N.J., pp. 335-385.

Primary Examiner—Douglas W. Olms
Assistant Examiner—Alpus H. Hsu
Attorney, Agent, or Firm—Ratner & Prestia

[57] ABSTRACT

The present invention identifies boundaries of data packets within a serial data stream and transfers data belonging to these packets to an external device for processing or storage. Identification is accomplished at relatively high speed by parallel processing techniques using a state machine. Data may be transmitted through separate channels to a multiple channel link. This link selects one channel at a time for a predetermined period of time, and allows the data stream from the selected channel to be transmitted to the flag detector. Some of the bits in the digital data stream may be part of a flag. The flag detector generates a value corresponding to the number of bits which may correspond to a portion of a flag in the data that has entered the flag detector. Additional data from the digital data stream entering the flag detector may include the remaining bits of the flag. If so, then the detector indicates that a flag has been found. Based on the location of a flag, boundaries may be determined for data in a packet.

15 Claims, 6 Drawing Sheets

FIG. 4

F = FLAG
X = 0 OR 1

| PRESENT STATE | | | INPUT | | NEXT STATE | | | OUTPUT | |
|---|---|---|---|---|---|---|---|---|---|
| INF(n-3) | F(n-2) | F(n-1) | F(n) | ALIGN(n-2) | INF(n-2) | F(n-1) | F(n) | STARTF(n-2) | ENDF(n-2) |
| 0 | 1 | 1 | 1 | X | 0 | 1 | 1 | 0 | 0 |
| 0 | 1 | 1 | 0 | X | 0 | 1 | 0 | 0 | 0 |
| 0 | 1 | 0 | 0 | 1 | 1 | 0 | 0 | 0 | 0 |
| 0 | 1 | 0 | 0 | 0 | 0 | 0 | 0 | 1 | 0 |
| 0 | 1 | 0 | 1 | X | 1 | 0 | 1 | 0 | 0 |
| 0 | 0 | 0 | 0 | X | 0 | 0 | 0 | 1 | 0 |
| 0 | 0 | 0 | 1 | X | 0 | 0 | 1 | 0 | 0 |
| 0 | 0 | 1 | 0 | X | 0 | 1 | 0 | 0 | 0 |
| 0 | 0 | 1 | 1 | X | 1 | 1 | 1 | 0 | 0 |
| 1 | 0 | 0 | 0 | X | 1 | 0 | 0 | 0 | 0 |
| 1 | 0 | 0 | 1 | X | 1 | 0 | 1 | 0 | 0 |
| 1 | 0 | 1 | 0 | X | 1 | 1 | 0 | 0 | 0 |
| 1 | 1 | 1 | 1 | X | 0 | 1 | 1 | 0 | 1 |
| 1 | 1 | 0 | 0 | X | 1 | 0 | 0 | 0 | 1 |
| 1 | 1 | 0 | 0 | 1 | 0 | 0 | 0 | 1 | 0 |
| 1 | 1 | 0 | 1 | X | 0 | 0 | 1 | 0 | 0 |
| 1 | 1 | 1 | 0 | X | 0 | 1 | 0 | 0 | 0 |
| 1 | 1 | 1 | 1 | X | 0 | 1 | 1 | 0 | 0 |

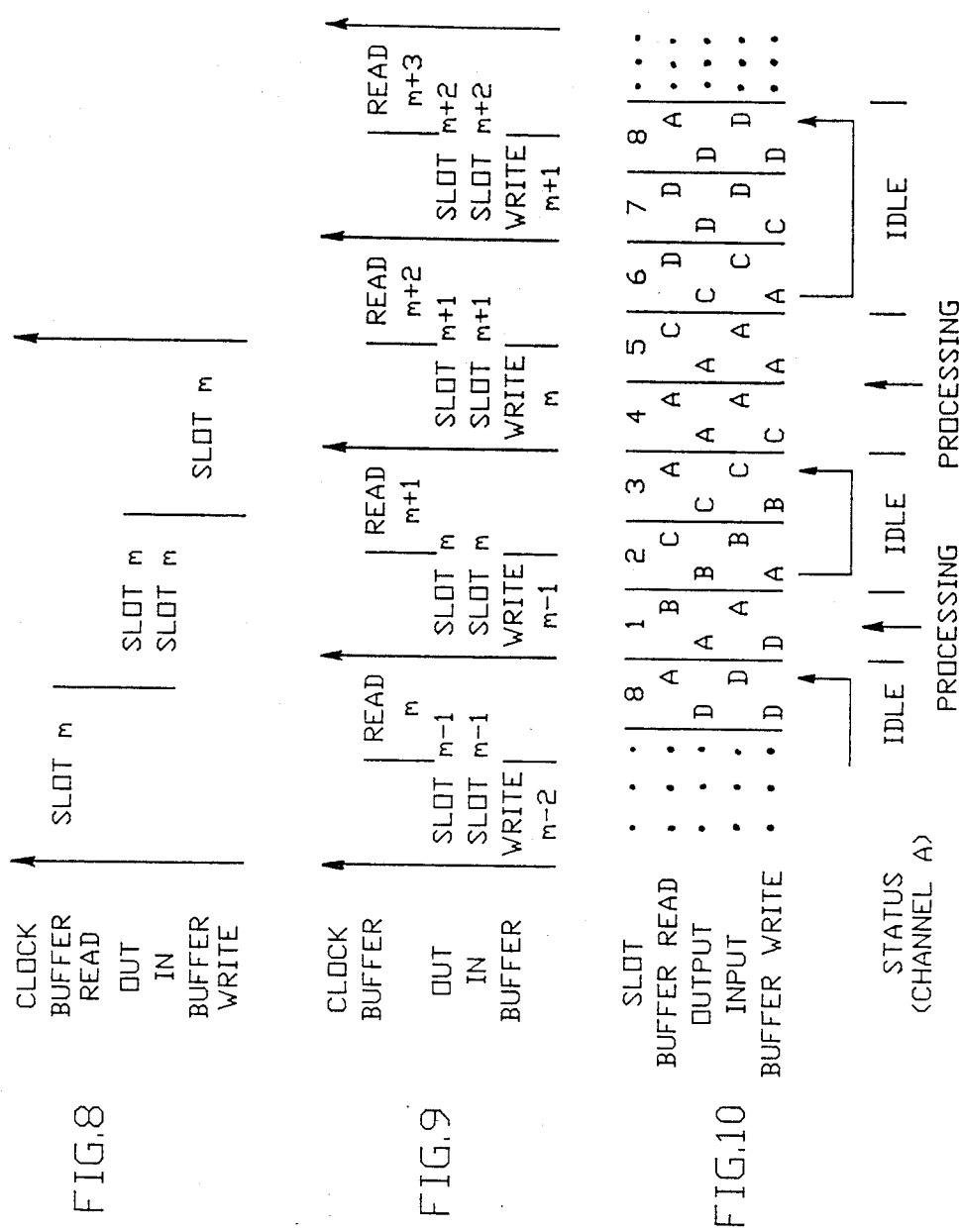

PARALLEL ARCHITECTURE FOR HIGH SPEED FLAG DETECTION AND PACKET IDENTIFICATION

FIELD OF INVENTION

This invention is in the field of data communication, and is specifically directed to the recognition of packets of data. In particular, a method is set forth for the identification of packets of data which are transmitted at a high rate of speed.

BACKGROUND OF THE INVENTION

In communication protocols, packet boundaries are often indicated by means of special patterns or flags. In a system using such a protocol, a flag detector/packet identifier is used to recognize flags and thus identify packets by their boundaries within a received stream of data.

Conventionally, a serial architecture is used with a bit-oriented protocol to identify flags in the received data. In these systems, flags are detected by processing a serial stream of data one bit at a time and by using "shift and compare" techniques. This serial architecture has several limitations.

First, unless sophisticated high speed logic is used, system speed is limited by the speed of serial logic technology. For example, for Advanced Schottky TTL logic, the processing speed may be between 50 and 70 megahertz. This constraint may make the flag detector a bottleneck for systems where packet communications take place over high speed links.

Second, conventional serial architecture only operates in a single channel mode. Because flag detection is a sequential bit by bit process, it generally operates on a single packet of data at a time. Thus, in a system which uses a high-speed link carrying multiple data channels according to a time division multiplexed (TDM) format, a separate flag detector may be used to process data arriving on each channel. This greatly increases the cost and complexity of the data link interface and diminishes the flexibility for systems in which the number of channels may vary.

SUMMARY OF THE INVENTION

The present invention identifies delimiting flags within a serial data stream. Identification is accomplished by processing techniques which evaluate multiple bits in parallel.

The invention can be directly interfaced to a multiple channel data link which has a variable number of channels. In addition, all required functions can be performed by dedicated hardware, having relatively low processing delay. Data is transmitted through separate channels of the multiple channel link. The multiple channel link selects one channel at a time for a predetermined period of time, and allows the data stream from the selected channel to be transmitted to the flag detector.

A flag (which consists of a predetermined bit pattern) is identified as follows:

(1) The digital data stream enters the flag detector, a predetermined number of bits at a time. Some of these bits may be part of a flag.

(2) The flag detector generates an indication of the number of bits which may correspond to a portion of the flag in the data that has entered the flag detector.

(3) Additional data from the digital data stream enters the flag detector.

(4) If some bits of this additional data represent the remaining bits of a flag, then the detector indicates that a flag has been found.

Based on the location of a flag, byte boundaries for the beginning and end of a packet may be determined. Using this information, an output register provides only those bits corresponding to the packet to a buffer for storage or manipulation.

BRIEF DESCRIPTION OF THE DRAWINGS

FIG. 4 is a table which summarizes the relationship between states, inputs and outputs in the packet identification component of the flag detector shown in FIG. 2;

FIG. 8 is a timing diagram which shows single cycle operation of the TDM register shown in FIG. 7;

FIG. 9 is a timing diagram showing the pipeline operation of the TDM register shown in FIG. 7;

FIG. 10 is a timing diagram which illustrates TDM register operation.

DETAILED DESCRIPTION

Figure 1:
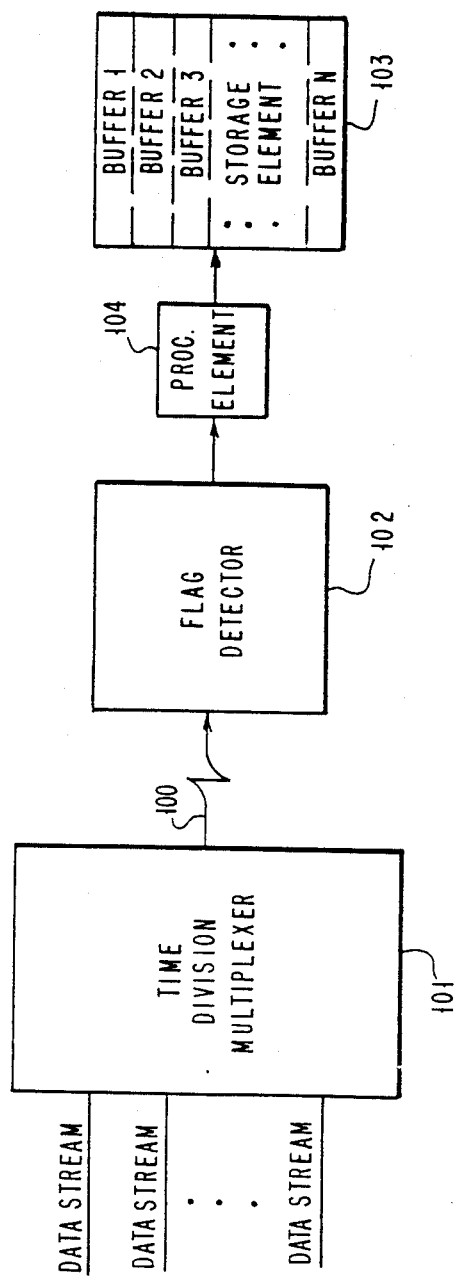
FIG. 1 is a block diagram of a communications system which may support a flag identification function in accordance with the present invention.

The following are definitions of terms that are used in the description of the invention that follows.

TIME DIVISION MULTIPLEXING - A process for transmitting two or more signals over a common path by using successive time intervals for different signals.

FLAG PATTERN - A predetermined sequence of bits which are used to determine packet boundaries.

ABORT PATTERN - A predetermined sequence of bits which are used to indicate that the information contained in the current packet is to be ignored.

FLAG DETECTION - The process whereby a flag pattern in the data stream is identified.

PACKET DETECTION - The process whereby a received byte is evaluated to determine whether or not it belongs to a specific packet.

As is well known in the art, data is represented by being grouped into collections of binary digits called bytes. In a typical communications system, bytes of data are transferred consecutively. A group of consecutively transferred data bytes (excluding flags) is defined as a packet.

Data communication systems are often implemented in a time-division multiplexed environment. In this environment, it may be difficult to transmit a complete packet of data in a single time slot. Often, packet transmission emanating from one channel are suspended at the end of a time slot, to be resumed later. In the interim, packet transmission from alternate channels are initiated, only to be suspended for later continuation.

When dealing with packets, it is desirable to know the exact boundaries of the beginning and end of each packet. This information can be used to prevent bits of data from one packet from being erroneously assigned to a different packet. Packet boundaries are determined through the use of a flag mechanism. By identifying a flag in the stream of data, the transferring equipment is given an indication of when the first byte in a packet will be received and when the last byte in the packet has been received.

The flag detector consists of a flag detection component and a packet identification component. Each component functions as a state machine. As the flag detection component processes a data stream it assumes various states. Each state is indicative of the contents of the data stream. When the flag detection component locates a flag, it passes this information to the packet identification component.

The flag bit pattern used to separate packets and the encoding of data within a packet are determined according to a predetermined communications protocol. The flag detection mechanism used in this embodiment of the invention is compatible with well known protocols such as LAPD, HDLC and SDLC. According to these protocols, a flag in the data stream includes six or more consecutive binary ones. To prevent actual data from being interpreted as a flag, the data is preprocessed before it is transmitted. This prepossessing step encodes data values which may be mistaken for flags. By one, exemplary type of encoding, every string of five consecutive ones in the input data stream has a binary zero inserted between it and the next consecutive bit. After a packet has been received, this encoding operation is reversed by removing the binary zero following any string of five consecutive binary ones.

High speed flag detection and packet identification may be described as one function, but to simplify explanation the two functions are divided, and described as being performed by separate hardware components.

In this embodiment of the invention, data enters the component which performs the flag detection function one byte at a time. The received bits which constitute this byte are simultaneously evaluated to determine if a flag (or a fractional part thereof) has been received. Since a flag may be split across two bytes two such evaluations may be required and, so, two machine cycles are used for flag detection. Because packets smaller than two bytes are invalid, the packet identification component determines if a valid packet has been received over three clock cycles. If a valid packet has been received, then the data for that packet which has been extracted from the received stream of data may be transferred to a successive stage for manipulation (such as the protocol decoding step outlined above) or for storage.

In FIG. 1, a communications system is shown which may use the flag detection scheme according to the present invention. Data is provided to this system through a series of data communication channels. Each channel is coupled to the system through a time division multiplexer 101. The multiplexer 101 periodically switches between different communication channels to which it is coupled. One data channel is chosen by the time division multiplexer 101 for a predetermined period of time and after which, another channel is selected, allowing a different data stream to pass. As a data stream passes through the multiplexer 101, it is transmitted across a data link 100 to the flag detector 102. The flag detector 102 evaluates the entering data stream to determine whether it contains a bit pattern corresponding to a flag. When a first non-flag bit pattern is detected, the flag detector indicates that transmission for a particular data packet has begun. When the next flag is detected for the channel, t he flag detector indicates that a complete data packet has been received. Based upon the location of the flags in the input data stream, boundaries can be determined for the beginning and end of the packet.

Data provided by the flag detector 102 is passed on to a processing element 104. This processing element may, for example, decode the data in accordance with the protocol being used by each individual channel. The decoded data provided by the processing element is applied to the storage element 103. As indicated in FIG. 1, the storage element 103 includes multiple data buffers, one for each channel processed by the time division multiplexer 101. These buffers hold the decoded data which may be used by further processing elements (not shown) or which may be encoded in packets and passed through a communications channel to other data processing systems on a network.

The operation of the flag detector 102, is made significantly more complex because the data stream traveling through the time division multiplexer 101 is constantly changing. A TDM link may include many channels having respectively different data rates. Desirably, each channel should be handled separately because it comes from a different source. However, instead of providing a flag detector for each channel, a TDM flag detector is disclosed which serves all channels of a TDM link. While the TDM flag detector may be coupled to many channels, only one channel is processed in a time slot. The intermediate results of processing in each slot are stored and retrieved for the next time slot belonging to the same channel. For each time slot, the retrieval of intermediate results is controlled by a table (slot/channel map) specifying the channel associated with each time slot. This table is updated each time the TDM link is reconfigured.

The flag detector design is based on a state machine representation. In operation the flag detector 102 uses not only a current byte of input data, but also information pertaining to the content of the previously received byte of input data. The flag detector 102 maintains this information in the form of a channel state. The channel state indicates the relationship between successive bytes of data.

The flag detector 102 has two functions: flag detection and packet identification. Flag detection may be performed knowing only the previous input data byte, but other functions such as boundary and byte alignment computations (described below in reference to Table 2) use a two-cycle delay. The packet identification function, however, requires a three-cycle delay. Because of the total number of states involved, a state machine performing both flag detection and packet identification functions is complex to analyze and formulate. A decomposition into two separate logical state machines, a "bit" state machine and a "byte" state machine, is more tractable and is used in this embodiment of the invention. The flag detector can therefore be viewed as either a large composite state machine or two smaller separate state machines. The actual implementation, however, may use a composite state machine to reduce external connections and propagation delay. One skilled in the art could readily design and build such a composite state machine from the disclosure provided below.

Figure 2:
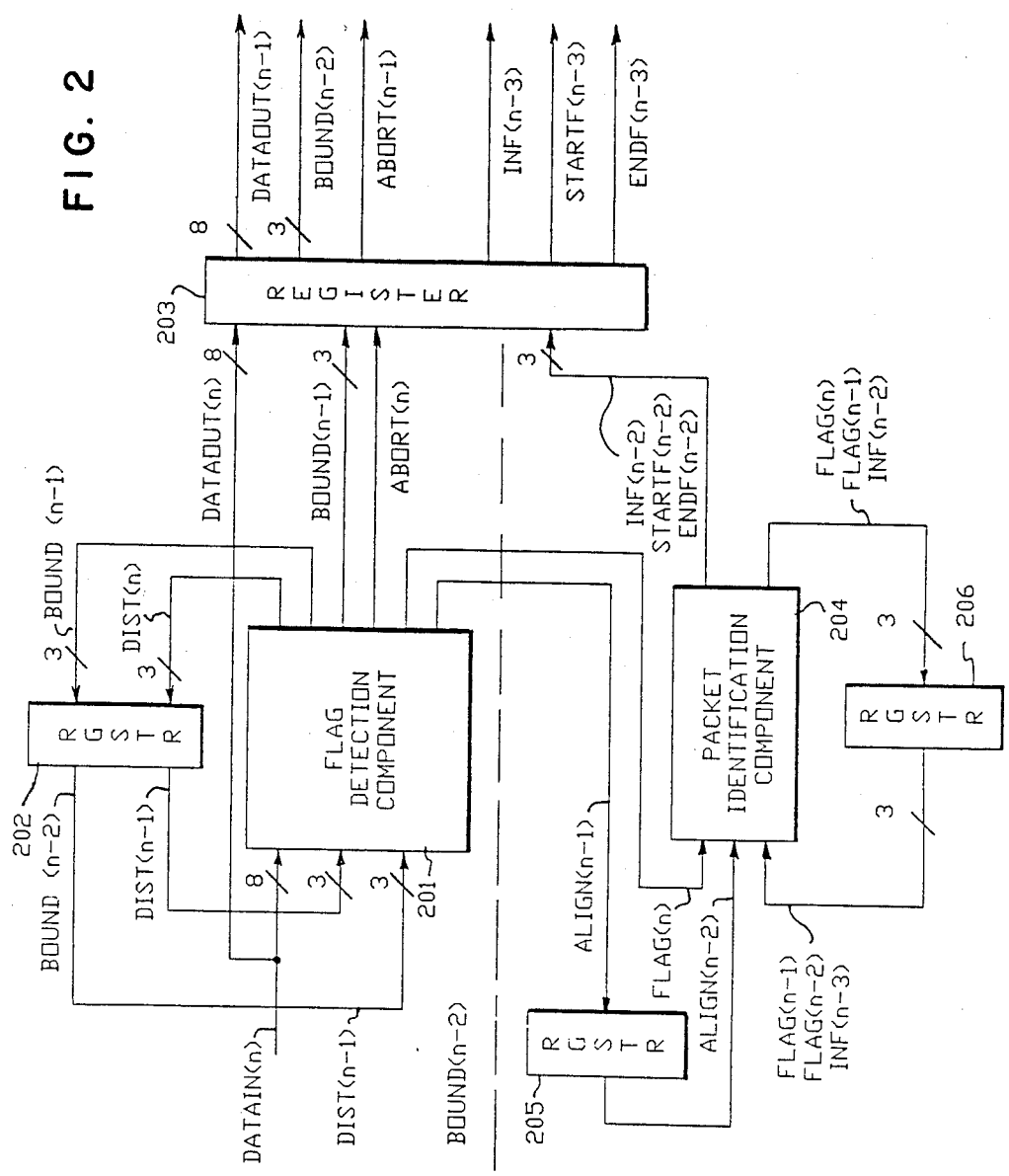
FIG. 2 is a block diagram of an exemplary flag detector shown in FIG. 1.

A block diagram showing an overview of the flag detector 102 is provided in FIG. 2. Input and output signals of the flag detector correspond to information received from and sent to components external to the two state machines, while states are determined from internal computations of each state machine. Both state machines in the flag detector exchange information.

The flag detection component 201 used in this embodiment of the invention is state machine which uses knowledge about individual bit values and bit positions to detect flag patterns within the data stream. In this exemplary embodiment of the invention the flag pattern 01111110 is used. This pattern is used to determine whether a flag or actual data is being transmitted over the channel. Because of the parallel (byte by byte) implementation, information concerning two consecutive bytes is used. This is done because a flag may be received over two bytes, e.g. 3 bits (XXXXX011) in a first byte and the remaining 5 bits (11110XXX) in the next byte.

There are three input ports shown for the flag detection component 201, DATAIN, DIST and BOUND. DATAIN is the input port on which the current data byte is received. DIST provides information on the position of the last '0' in the previous byte. BOUND indicates the offset if any between received byte boundaries and flags.

The flag detection component 201 contains five output terminals. Two of these terminals, FLAG and ALIGN, are coupled to the packet identification component 204. The FLAG signal specifies if a flag is detected within the data stream. The ALIGN signal indicates whether the last flag pattern received was aligned with the received byte boundary. The signals forwarded to the output register 203 consist of the current data byte which has been received (DATAOUT), the previously mentioned BOUND signal, and an ABORT signal. The ABORT signal is generated if an ABORT pattern is detected. This signal is used to notify the storage element 103 of FIG. 1 that the packet of data which is currently being written to the buffer may be discarded.

As set forth above, the DIST signal specifies the position of the last '0' in the previously received byte. This signal is used to detect flag patterns and abort patterns in the data. In this embodiment of the invention, detection is achieved by identifying sequences of six or more consecutive ones, This pattern is inferred from the DIST signal and the bits in the current byte.

The first and last bytes of a received packet may contain only a few bits of actual data, while the other bits may correspond to the trailing and leading bits of the start and end-of-packet flags, respectively. In this instance the storage unit 103 is notified not to process the flag bits as valid data bits. Depending on the location of the last/first bit of the flag pattern, there may be between 1 and 8 valid data bits in the first and last received byte of a packet, since the flag pattern may start at any bit position within a byte. The signal BOUND provides this information which is significant for the first and last bytes of a packet, and is updated only when a flag pattern is detected. The update is immediate at the start of a packet, since the flag pattern is detected at the same time as or even before the first data byte is received. At the end of a packet the update of the BOUND signal is usually (except when flags and byte boundaries are aligned) performed after a one byte delay, since flag detection may be completed one byte time after the end-of-packet flag is detected.

The inputs to the packet identification component 204 include the FLAG signal and the ALIGN signal from the flag detection component 201. The state of the packet identification component 204 is based upon whether flags were detected in the previous two bytes (flag (n-1) and flag (n-2)), and whether the channel received a valid data byte three bytes earlier (INF (n-3)). This information is used to determine whether flags or actual data are being transmitted through the data channel in order to avoid improper packet identification.

Three output signals are generated by the packet identification component 204: STARTF, INF, ENDF, which respectively indicate if the data byte being provided is the first byte of a packet, inside of a packet, or the last byte of a packet. This information is used by the storage unit to properly store incoming packets, and correctly update the associated pointers. The output signals of the packet identification component 204 are generated with a delay of three bytes-times. This delay is used, not only to account for the two bytes used to identify flags, but also to detect invalid packets (i.e. those containing less than two bytes). In many cases, for example, if a flag is detected as aligned (ALIGN=1) and the next byte is not a flag pattern, the STARTF=1 signal could be immediately generated (the case ALIGN=0 would require an additional one byte delay). In this embodiment of the invention, it is the two-byte minimum packet size requirement that results in a total delay of three bytes.

The state of the flag detection component is composed of two values, DIST which gives the distance from the last '0' to the end byte-boundary and BOUND which specified the offset with respect to the end byte-boundary introduced by the last detected flag. The output signal BOUND is described below. Because the state value DIST is solely a function of the current input data byte, its value is expressed in terms of DATAIN as shown in Table 1.

TABLE 1

| Input DATAIN b b b b b b b b 7 6 5 4 3 2 1 0 | Output DIST |
|---|---|
| x x x x x x x 0 | 0 |
| x x x x x x 0 1 | 1 |
| x x x x x 0 1 1 | 2 |
| x x x x 0 1 1 1 | 3 |
| x x x 0 1 1 1 1 | 4 |
| x x 0 1 1 1 1 1 | 5 |
| x 0 1 1 1 1 1 1 | 6 |
| 0 1 1 1 1 1 1 1 | 7 |

There are three normal output signals which are computed by using the distance to the last '0' in the previous byte and the actual data pattern present in the current byte. However, the value of the output signal BOUND is only updated when a flag is detected. Thus, BOUND is only modified at the first and last bytes of a packet. Its value is immaterial at any other position, and by definition taken to be equal to the previous value.

Table 2 summarizes the different values of the output signals of the flag detection component 201, together with their relation to the state and input data values. For presentation purposes the value of the previous data byte (DATAIN(n-1) has also been included in the table. This data is, however, not actually present since the only information used by the packet identification component 204 of the state machine is the position of the last "0" in the data byte as given by DIST(n-1). The three output signals generated at each cycle are FLAG(n), BOUND(n-1) and ALIGN (n-1).

FLAG(n) is defined as the flag indicator for the current byte. BOUND(n-1) is defined at the offset in bits from the byte boundary of the previous byte. ALIGN(n-1) is defined as the byte alignment indicator (=if aligned) for the previous byte.

These signals are governed by the following equations:

$$FLAG(n) = f(DATAIN(n), DIST(n-1))$$

$$BOUND(n-1) = f(DATAIN(n), DIST(n-1))$$

$$ALIGN(n-1) = f(BOUND(n-1))$$

where n is the current byte and n-1 is the previous byte.

TABLE 2

| State | | Input | | Output | |
|---|---|---|---|---|---|
| DIST(n-1) | DATAIN(n-1) | DATAIN(n) | FLAG(n) | BOUND (n-1) | ALIGN (n-1) |
| x | xxxxxxxx | 01111110 | 1 | 0 | 1 |
| 0 | xxxxxxx0 | 1111110x | 1 | 1 | 0 |
| 1 | xxxxxx01 | 111110xx | 1 | 2 | 0 |
| 2 | xxxxx011 | 11110xxx | 1 | 3 | 0 |
| 3 | xxxx0111 | 1110xxxx | 1 | 4 | 0 |
| 4 | xxx01111 | 110xxxxx | 1 | 5 | 0 |
| 5 | xx011111 | 10xxxxxx | 1 | 6 | 0 |
| 6 | x0111111 | 0xxxxxxx | 1 | 7 | 0 |
| | Otherwise | | 0 | BOUND (n-2) | 0 |

The only abnormal output is the ABORT signal which is set to '1' when a pattern of seven or more consecutive is encountered in the received data. This signal is used to indicate to the storage unit that the packet currently received can be discarded. All valid data bytes following the ABORT signal are simply ignored until a new packet is started.

In Table 3, the truth table for the ABORT signal shown. The value of the previous data byte DATAIN(n-1) has been included for presentation purposes. ABORT(n) is defined as the ABORT pattern indicator for slot n.

This signal is governed by the equation (1).

$$ABORT(n) = f(DATAIN(n), DIST(n-1)) \quad (1)$$

TABLE 3

| State | | Input | Output |
|---|---|---|---|
| DIST(n-1) | DATAIN(n-1) | DATAIN(n) | ABORT(n) |
| 0 | xxxxxxx0 | 111111x | 1 |
| 1 | xxxxxx01 | 111111xx | 1 |
| 2 | xxxxx011 | 11111xxx | 1 |
| 3 | xxxx0111 | 1111xxxx | 1 |
| 3 | xxx01111 | 111xxxxx | 1 |
| 5 | xx011111 | 11xxxxxx | 1 |
| 6 | x0111111 | 1xxxxxxx | 1 |
| x | xxxxxxxx | x1111111 | 1 |
| x | xxxxxxxx | 1111111x | 1 |
| | Otherwise | | 0 |

The packet identification component 204 is coupled to the flag detection component 201 via two signals. These signals consist of a flag indicator for the current byte (FLAG(n)) and an alignment indicator for the byte received two cycles previously (ALIGN(n-2)). The alignment indicator is used primarily to help the packet identification component make the right decision on packet boundaries in certain, otherwise ambiguous, situations. As a secondary function, the alignment indicator is used to ensure that all data packets which are smaller than two bytes are detected and rejected as invalid. The detection of invalid packets is described below in reference to FIG. 5.

The packet identification component 204 is designed as a state machine. Inputs, states, and outputs are summarized in Table 4.

TABLE 4

| STATE | INPUT | OUTPUT |
|---|---|---|
| In Frame (n-3) | Flag (n) | Start Frame (n-2) |
| Flag (n-2) | ALIGN (n-2) | End Frame (n-2) |
| Flag (n-1) | | In Frame (N-2) |

The input signals received at each cycle and the previous state values are used to compute the next state value. The state consists of three values. Two of these values, (FLAG(n-1) and FLAG(n-2)) indicate if flags were recognized in the last clock cycle and the next to the last clock cycle, respectively. The third value (INF(n-3)) specifies if the channel was receiving valid data three clock cycles ago. The update of the FLAG indicator is directly related to the input signal, while the INF indicator is changed as explained below.

Figure 3:
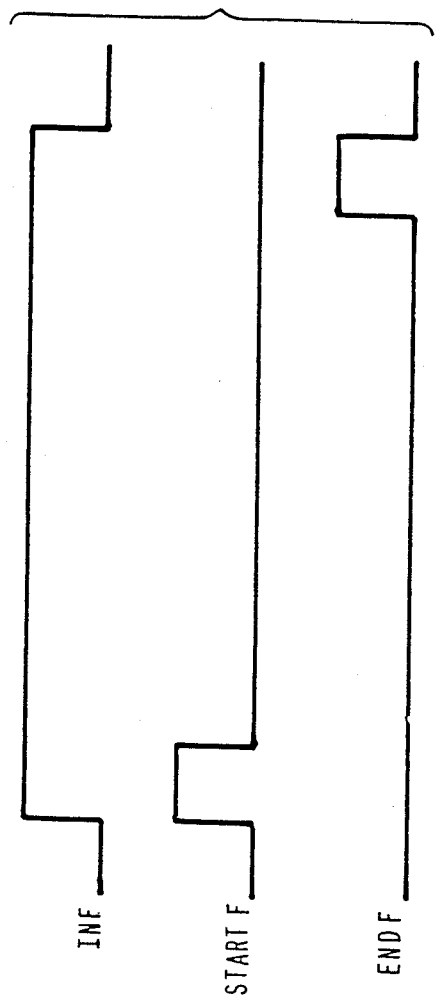
FIG. 3 is a timing diagram of output signals which are generated by the packet identification component of the flag detector shown in FIG. 2.

Input signals and state values are used to compute the output signals. One output signal (INF(n-2)) specifies if the byte received two cycles earlier is inside or outside a packet (inside =1, outside =0). When this signal has a value of 1, the provided data byte is forwarded to the processing unit 104. Otherwise, this byte is discarded. The two other output signals (STARTF(n-2) and ENDF(n-2)) indicate, after a two cycle delay, if a received byte is the first or last byte in a packet. Such transition signals are typically used by the storage unit 103 receiving the packets to identify the memory location of a stored packet. A timing diagram illustrating the output signals is shown in FIG. 3.

The general operation of the packet identification component 204 is illustrated in terms of Boolean relations, shown in FIG. 4.

Because of the method by which the flag detection process occurs, there is a two cycle delay before the signals STARTF and ENDF associated with a packet are available. In a preferable embodiment of the invention outputs the system is synchronous and the signals STARTF, ENDF and INF are forwarded to the next stage simultaneously. Thus, it is preferable to add an output register 203 which will result in a third byte of delay. This register compensates for different propagation delays of logic devices in the state machine during state computation.

Figure 5:
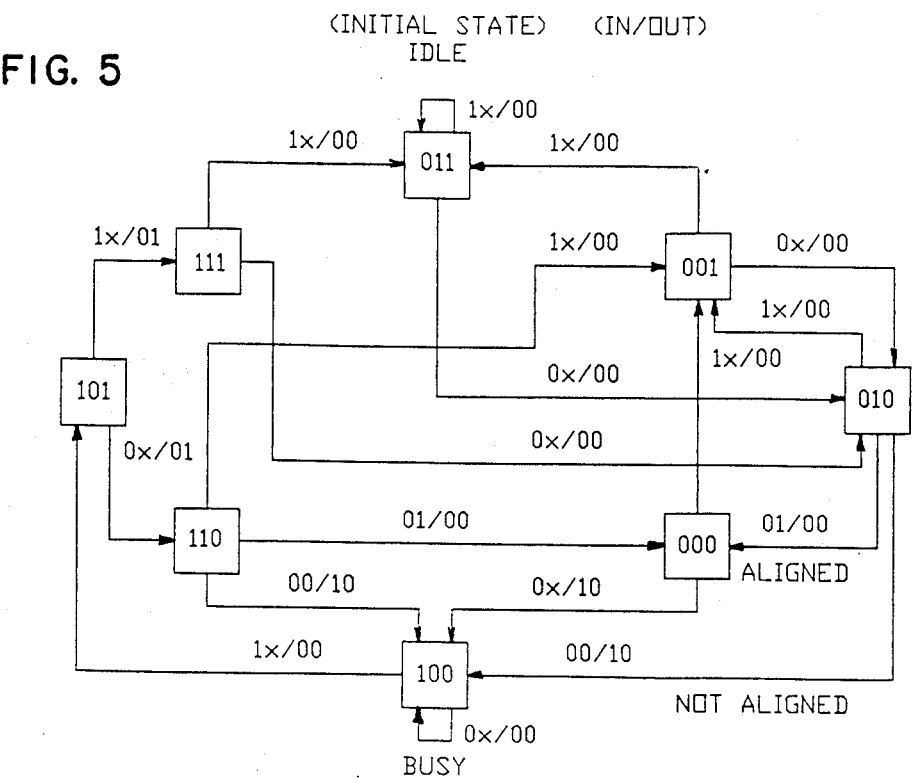
FIG. 5 is a state transition diagram for the packet identification component of the flag detector shown in FIG. 2.

The state table of FIG. 4 may be simplified by the use of a state transition diagram. The diagram is an aid to understanding the logic flow of packet identification as different byte patterns are being received. A total of eight states are used, two of these states correspond to the possible normal status of the channel (busy or idle), while the others indicate ongoing changes in the channel status. The state transition diagram is shown in FIG. 5. Its interpretation is based on the information shown in Table 4.

A unique definition is assigned to each state in the state transition diagram. While a direct relationship exists between the numerical value of a state and its descriptive interpretation, the actual relationship used in this embodiment of the invention is merely exemplary. Any corresponding relationship may be used.

The states may be defined as follows:

This state is the idle state (only consecutive flags are received), and represents the normal state outside of a packet. In this embodiment of the invention it is also assumed to be the initial state for the state diagram.
100
This is the busy state, or normal state inside a packet.
010, 001, 000.
These are transition states from idle states to busy states. Assuming that no error conditions are present (less than two bytes of data), there are two possible transition paths between the idle and busy states. The first path corresponds to the case of non-aligned flag, while the second path assumes aligned boundaries.
1. 011→010→100 (Not Aligned)
2. 011→000→100 (Aligned)
A failure to meet the two-byte minimum packet length requirement causes a transition to the error state 001, and then possibly back to the idle state, 011.
110, 101, 111, 001, 000.
These states are regular transition states from busy to idle states, as well as "error" states (001 and 110) which are traversed when the two byte minimum requirement is violated. Under normal operating conditions, there is only a single path from the busy state to the idle state, namely 100→101→111→ 011

It is desirable to implement a scheme from which error recovery may occur. Typical error recovery may be implemented in the following situations:

Detecting consecutive but misaligned flags by ignoring non-flag data, inserted between two consecutive but misaligned flags, when the data is less than two bytes in length;

detecting transmission errors within a string of flags.

Figure 6:
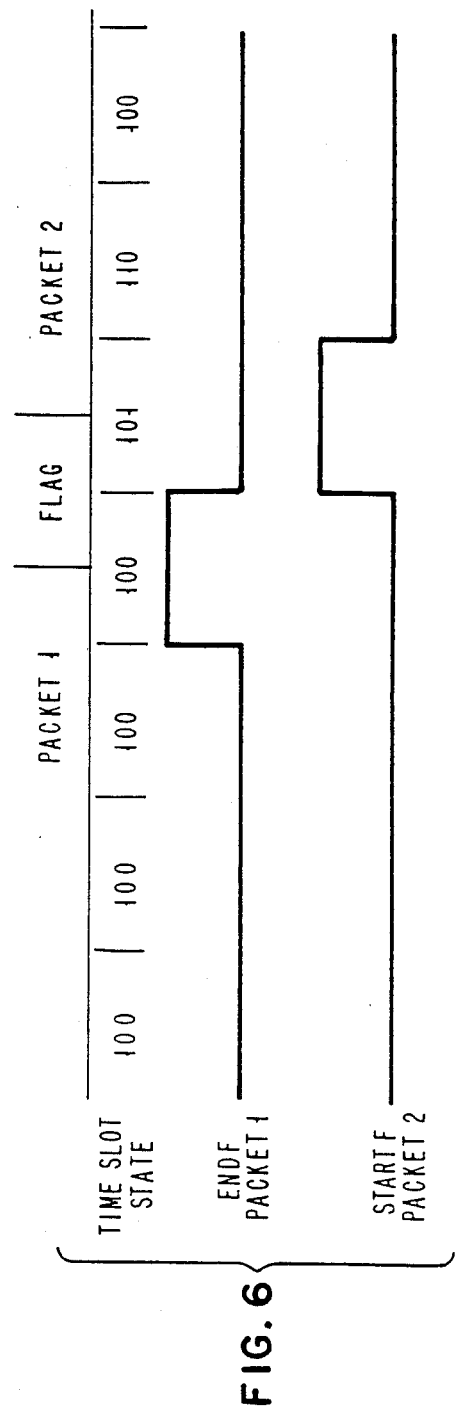
FIG. 6 is a timing diagram for a system in which packet boundaries are designated by a single delimiter.

In addition to recovering from the above error conditions, the state machine is capable of operating in a single delimiter mode i.e. where a single flag serves as both the closing flag of the previous packet and the opening flag of the following packet. A typical example of a state transition in a system using a single delimiter protocol is provided in FIG. 6.

The flag detection architecture may be extended to a time division multiplexed link interface, i.e. an interface wherein data channels are sequentially selected for data transfer over a predetermined time interval. The TDM link interface is capable of concurrently handling multiple TDM channels. The major modification to the architecture is the replacement of all registers, including state and output registers, by TDM registers. A TDM register represents multiple logical registers, one per TDM channel, from which data and states can be retrieved and stored at each time slot according to the channel currently active. This TDM register is preferably implemented using a RAM-based structure capable of supporting arbitrary time slot to channel allocation. As will be shown, pipelining may also be used to ensure high speed operation.

The major task of the TDM register is to ensure that time slots associated with a given channel are processed sequentially although these time slots may not occur consecutively in the received data stream. Thus, at the end of each time slot information pertaining to the current channel is stored so that it may be made available at the beginning of the next time slot belonging to the channel.

Figure 7:
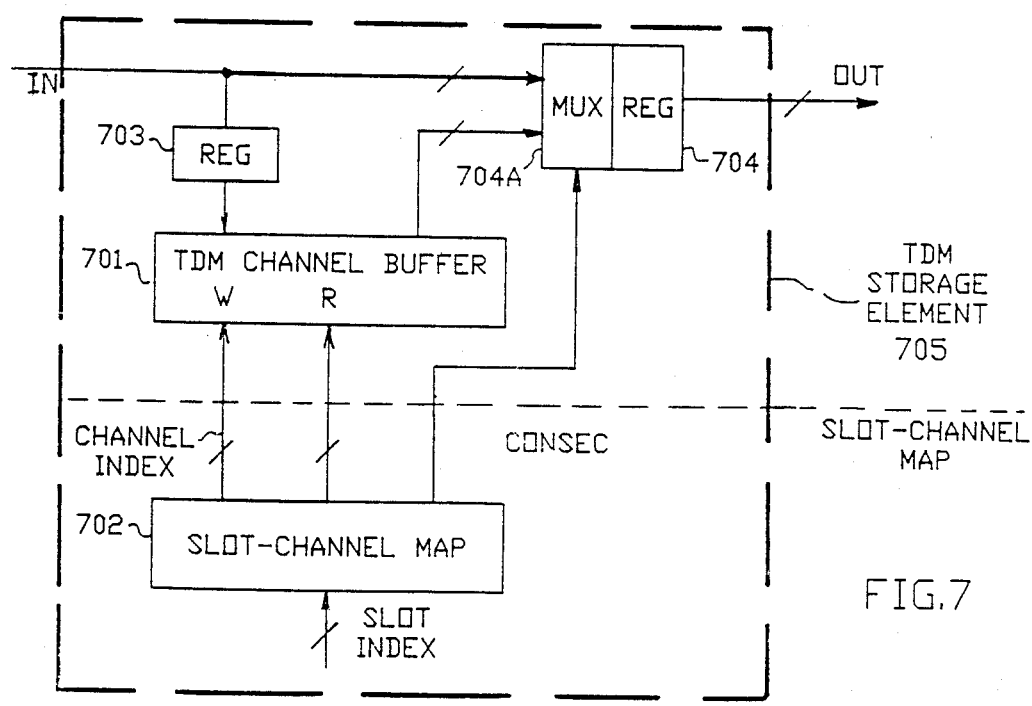
FIG. 7 is a block diagram of a TDM register.

A block diagram illustrating the structure of a TDM register implementing this function is provided in FIG. 7. A TDM register consists of two basic components: a TDM storage element 705 dedicated to each TDM register, and a slot-channel map 702 which indicates the slot which is associated with each channel. The slot-channel map 702 is shared by all TDM registers.

A TDM register holds the values in the registers 202, 203, 205 and 206 of the flag detector shown in FIG. 2 for each data channel for which data is being transmitted through the transmission link 100 of FIG 1. In a TDM system, data for each channel is transmitted in multi-bit units. The TDM multiplexer 101 cycles through the channels in a predefined sequence to send respective data units across the transmission link !00. As each new data unit is received, the state of the flag detector is stored in the TDM storage element at an address reserved for the previous channel, and another location is accessed to restore the state of the channel corresponding to the newly received data unit.

The TDM storage element 705 includes regular registers 703, 704 which serve as input and output interfaces of the storage element. The TDM channel buffer 701 has an entry for each channel, where its most recent state and data values (i.e. the contents of registers 202, 203, 205 and 206 of FIG. 2) are stored. The contents of a given TDM channel buffer entry are updated at the end of each time slot belonging to the channel. Similarly, at the beginning of each time slot, information corresponding to the active channel is placed in the output register 704 of the TDM storage element. The correspondence between a channel and a time slot is provided by the slot-channel map 702 which, at each clock cycle, generates the associated channel number. This number is used as an address to write data into and read data from an address space allocated to the corresponding channel in the storage element.

In order to allow for high speed operation, pipelining may be used to decrease access time constraints on the channel buffer unit of the TDM register. The four operations (input, output, retrieve data and store data) that are performed by the TDM register can be scheduled to be executed in parallel. These operations are performed in a cycle that corresponds to the cycle time for flag detection state transitions. Data and state are being fetched from the buffer before the beginning of the corresponding cycle and written back after the end of the cycle, while only the input and output operations are performed during the cycle itself. All operations for each time slot, especially reading data from and writing data to the buffer, are therefore carried out over a span of three clock cycles. Without pipelining, each of the read and write operations would be executed within one clock cycle (as shown in FIG. 8). Such a requirement substantially increases the access time requirement of the channel buffer. That is to say, a faster channel buffer would be needed for equivalent performance.

The overall pipelining of the TDM register is illustrated by means of a timing diagram as shown in FIG. 9. It is assumed that a READ or a WRITE operation can be performed within one-half of one clock cycle. CLOCK denotes the timing signal issued at the beginning of each cycle. IN and OUT denote the signals present at the input and output ports of the TDM register, respectively. BUFFER (WRITE, READ) denotes the data storage and retrieval operations on the TDM channel buffer 701. Because of the synchronous system embodiment, both the input and output signals at each cycle correspond to the same channel. On the other hand, the READ and WRITE operations performed within the same cycle need not belong to the same channel since they are associated with different time slots.

The timing diagram of FIG. 10 is an example of pipelined buffer operations. For this example, it is assumed that a system exists with eight time slots and four channels (A,B,C,D) where channels have been assigned to time slots as follows:

TABLE 5

| Channel | Assigned Time Slots |
|---------|---------------------|
| A | 1, 4, 5 |
| B | 2 |
| C | 3, 6 |
| D | 7, 8 |

Each of these time slots corresponds to a unit of data which, in this embodiment of the invention, is assumed to be one byte.

As illustrated in FIG. 10, in the half cycle preceding the beginning of time slot 1, the content of the entry associated to channel A starts being retrieved from the TDM channel buffer 701 and is forwarded to the output register 704 (see FIG. 5). The data is available at the beginning of the first half of time slot 1, while the input of data only occurs during the second half cycle of time slot 1. This delay corresponds to the computation and propagation time used to obtain the new state value after the state and data information have been forwarded to the state machine. The input data is received in the input register 703 and is written back into the TDM channel buffer 701 during the first half cycle of time slot 2.

A similar procedure is followed for time slot 4, but time slot 5 requires special consideration. This is caused by the fact that time slots 4 and 5 are consecutive time slots belonging to the same channel. In such a situation, the channel state and data obtained at the end of slot 4 cannot be fetched in advance to be ready at the beginning of slot 5, since, at that time, it is just being written back in the TDM channel buffer 701. This timing problem is resolved by providing a direct connection between the input register 703 and output register 704, to be used in case of consecutive slots. In this example, when the next state and data become available at the input during the second cycle of slot 4, this information is not only forwarded to the input register, but also to a multiplexer 704A, which is shown in FIG. 7 as a part of the output register 704. This happens at the same time as information (previously stored state and data) is being fetched from the channel buffer. A control signal (CONSEC), generated by the slot-channel map 702, when set, specifies that the signal coming directly from the input should be selected at the output register 704. This results in correct updated state and data values being sent to the flag detector 102 at the beginning of time slot 5.

While the invention has been described in terms of an exemplary embodiment, it is contemplated that it may be practiced as outlined above with modifications within the spirit and scope of the appended claims.

The invention claimed is:

1. A method of detecting a packet boundary in a digital data stream, wherein the packet boundary is identified by a predetermined bit pattern, said method comprising the steps of:
   (a) receiving a first plurality of data bits;
   (b) examining the first plurality of data bits for a first fractional part of said predetermined bit pattern wherein the examination of each bit position of the plurality of data bits is performed concurrently;
   (c) receiving a second plurality of data bits;
   (d) examining the second plurality of data bits for a second fractional part of said predetermined bit pattern wherein the examination of each bit position of the second plurality of data bits is performed concurrently;
   (e) determining a packet boundary based upon the location of the first fractional part of said predetermined bit pattern and the location of the second part of said predetermined bit pattern.

2. A method of detecting a packet boundary in a digital data stream, wherein the packet boundary is identified by a predetermined bit pattern, said method comprising the steps of:
   (a) receiving a plurality of data bits;
   (b) examining the first plurality of data bits in parallel to locate a first fractional part of said predetermined bit pattern in terms of a distance for the first plurality of data bits, said distance being determined by a bit location, in the first plurality of data bits, of a significant bit of predetermined value;
   (c) receiving a second plurality of data bits;
   (d) examining the second plurality of data bits in parallel to locate a second fractional part of said predetermined bit pattern; and
   (e) determining a packet boundary based upon the distance for the first plurality of data bits and the location of the second fractional part of said predetermined bit pattern.

3. The method of claim 2, wherein step (e) comprises the steps of:
   (a) determining the presence of a flag based on the results of steps (b) and (d); and
   (b) determining a boundary for the flag wherein the boundary is a measure of the position of the flag relative to the beginning of a transmission of the digital data stream.

4. The method of claim 2, wherein, in step (b), each bit of the first plurality of data bits is examined concurrently.

5. The method of claim 2, wherein, in step (e), each bit of the second plurality of data bits is examined concurrently.

6. A method of using a state machine to locate a flag in a digital stream of data, wherein said flag consists of a predetermined bit pattern, said method comprising the steps of:
- (a) placing a plurality of bits, including a predetermined fraction of said digital stream of data, into the state machine;
- (b) concurrently examining each bit in said fraction of said digital data stream to generate a value corresponding to a number of bits occupied by the flag in the fraction of said digital stream.

7. The method of claim 6, comprising the additional step of indicating if all the bits that constitute a flag have been received.

8. A method of determining the relationship between a packet boundary and a byte boundary in a data stream, wherein the packet boundary is defined as a discontinuity in the data stream and the byte boundary is defined as a logical separation between successive groups of contiguous bits of data, said method comprising the steps of:
- (a) locating a fraction of flag pattern from a first group of contiguous bits of the data stream wherein said flag determines said packet boundary;
- (b) locating a second fraction of a flag from a second group of contiguous bits of the data stream;
- (c) determining an offset between the packet boundary and the byte boundary defined by said first and second groups of contiguous bits by evaluating the number of bits occupied by the flag in the second group of contiguous bits of said data stream.

9. The method of claim 8, wherein steps (a) and (b) are performed using a state machine.

10. The method of claim 8, wherein step (c) is performed by a state machine.

11. The method of claim 10, wherein step (c) includes the step of detecting errors.

12. The method of claim 11 including the additional step of recovering from said detected errors.

13. Apparatus for locating a data delimiting flag in a digital data stream, wherein a flag consists of a predetermined bit pattern, comprising:
means for receiving a plurality of bits, including a predetermined fraction of said digital data stream;
a state machine including means, coupled to said receiving means, for concurrently examining each bit in the fraction of said digital data stream to generate a partial flag indication value corresponding to a number of bits occupied by the flag in the fraction of said digital stream.

14. The apparatus set forth in claim 13, wherein said state machine further includes:
means for storing said partial flag indication value;
means for concurrently processing each bit in a subsequent fraction of said digital data stream and said partial flag indication value to generate a flag signal indicating that said flag has been detected.

15. The apparatus set forth in claim 14, wherein said state machine further includes means, coupled to receive said flag signal for generating signals defining boundaries for the data delimited by said flag.

* * * * *